US006956943B1

(12) United States Patent
Goodrich II et al.

(10) Patent No.: US 6,956,943 B1
(45) Date of Patent: Oct. 18, 2005

(54) METHOD AND APPARATUS FOR MINIMIZING THE TELEPHONY RING VOLTAGE POWER SUPPLY REQUIREMENTS OF AN INTEGRATED SERVICES HUB

(75) Inventors: Earl Goodrich II, East Lansing, MI (US); Craig Lyle Mahaney, Milan, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 606 days.

(21) Appl. No.: 09/727,201

(22) Filed: Nov. 30, 2000

(51) Int. Cl.[7] .............................. H04M 1/00; H04M 9/00
(52) U.S. Cl. ........................ 379/399.01; 379/395.01; 379/399.01; 379/413; 379/413.02; 379/9.05
(58) Field of Search ................................. 379/324, 382, 379/383, 387.02, 395.01, 399.01, 413, 412.02, 379/9.05

(56) References Cited

U.S. PATENT DOCUMENTS

| | | | | |
|---|---|---|---|---|
| 3,492,436 A | * | 1/1970 | Ulrich et al. ................ | 379/255 |
| 3,978,292 A | * | 8/1976 | Hill et al. .................... | 379/252 |
| 3,978,293 A | * | 8/1976 | Feiner ......................... | 379/252 |
| 4,349,703 A | * | 9/1982 | Chea, Jr. ..................... | 379/382 |
| 4,435,803 A | * | 3/1984 | Das et al. .................... | 370/228 |
| 5,579,386 A | * | 11/1996 | Koda .......................... | 379/252 |
| 5,666,355 A | * | 9/1997 | Huah et al. .................. | 370/311 |
| 5,881,142 A | | 3/1999 | Frankel et al. ............... | 379/167 |
| 5,963,620 A | | 10/1999 | Frankel et al. ............. | 379/93.05 |
| 6,075,784 A | | 6/2000 | Frankel et al. ............... | 370/356 |
| 6,141,339 A | | 10/2000 | Kaplan et al. ............... | 370/352 |
| 6,243,399 B1 | * | 6/2001 | Kaewell et al. .............. | 370/525 |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Sep. 12, 2000, Goodrich.
U.S. Appl. No. 09/702,933, filed Oct. 31, 2000, Mahaney.
U.S. Appl. No. 09/711,113, filed Nov. 9, 2000, Goodrich.

* cited by examiner

*Primary Examiner*—Binh Tieu

(57) ABSTRACT

The present invention discloses a method and apparatus for reducing the power required by an integrated services hub supporting a plurality of telephone circuits, comprising offsetting ringing of each of the plurality of telephone circuits such that all the telephone circuits do not ring simultaneously. The step of offsetting ringing of each of the plurality of telephone circuits preferably further comprises providing each telephone circuit with a ring cadence comprising a ringing interval and a non-ringing interval and defining a starting point for the ringing interval within each telephone circuit's ring cadence such that the starting point for the ringing interval for at least one telephone circuit falls substantially outside the ringing intervals of the remaining telephone circuits.

10 Claims, 2 Drawing Sheets

METHOD AND APPARATUS FOR MINIMIZING THE TELEPHONY RING VOLTAGE POWER SUPPLY REQUIREMENTS OF AN INTEGRATED SERVICES HUB

BACKGROUND OF THE INVENTION

The present invention relates to an integrated services hub (ISH) for use with broadband packet networks, and more specifically it relates to a method and apparatus for minimizing the power supply required to drive ring voltage to telephones connected to the ISH.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports (also referred to as jacks) for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the ISH and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

Another example of such a central office function being provided by the ISH is telephone ring voltage. In the traditional POTS system, the central office provides necessary voltage to ring the telephones located a customer's premises. In order to mitigate the effects of power loss across the potentially long line from the central office to the customer's premises, the ring voltage provided by the central office is a higher voltage than would be required by equipment located at the customer's premises. The ISH contains an internal ring voltage power supply that provides ring voltage to the telephones connected to the ISH. The number of telephone interfaces impacts the minimum requirements of the ring voltage power supply residing in the ISH, as the amount of power used by the ISH to generate telephone ring voltage increases with the number of telephone interfaces being served. Generally speaking, increased power generating capability leads to ring voltage power supplies that are more expensive, require a larger physical space, and generate additional heat, all of which are disfavored. The present invention addresses the need to minimize the size of the ring voltage power supply residing in the ISH by reducing the number of telephones that may ring simultaneously, thereby reducing the maximum current requirement of the ring voltage power supply and resulting in a smaller ring voltage power supply.

SUMMARY OF THE INVENTION

The present invention discloses a method for reducing the power required by an integrated services hub supporting a plurality of telephone circuits, comprising offsetting ringing of each of the plurality of telephone circuits such that all the telephone circuits do not ring simultaneously. The step of offsetting ringing of each of the plurality of telephone circuits preferably further comprises providing each telephone circuit with a ring cadence comprising a ringing interval and a non-ringing interval and defining a starting point for the ringing interval within each telephone circuit's ring cadence such that the starting point for the ringing interval for at least one telephone circuit falls substantially outside the ringing intervals of the remaining telephone circuits. More specifically, the step of defining a starting point for the ringing interval within each telephone circuit's ring cadence is defined such that the starting point for the ringing interval for each telephone circuit does not fall substantially within the ringing interval of any other telephone circuit. In a preferred embodiment, the plurality of telephone circuits is divided into at least two channel bank groups, and ringing of the telephone circuits within each of the channel bank groups is offset such that no more than about one telephone circuit from each channel bank group is ringing simultaneously.

The present invention discloses an apparatus for reducing the power required by an integrated services hub supporting a plurality of telephone circuits, comprising a plurality of subscriber line access circuits (SLICs) connected to and receiving power from a ring voltage power supply, each SLIC connected to a telephone circuit further comprising a telephone line for driving a ring voltage to a telephone connected to the telephone line and a microprocessor connected to and controlling the SLICs such that all the telephone circuits do not ring simultaneously. Each SLIC further comprises a positive terminal and a negative terminal connected to the ring voltage power supply and internal power amplifiers that drive power received from the ring voltage power supply via the terminals onto the telephone line. In a preferred embodiment, the plurality of telephone circuits is divided into at least two channel bank groups, the microprocessor connected to and controlling each of the channel bank groups such that no more than about one telephone circuit within each channel bank group is ringing simultaneously.

DETAILED DESCRIPTION OF THE INVENTION

Figure 1:
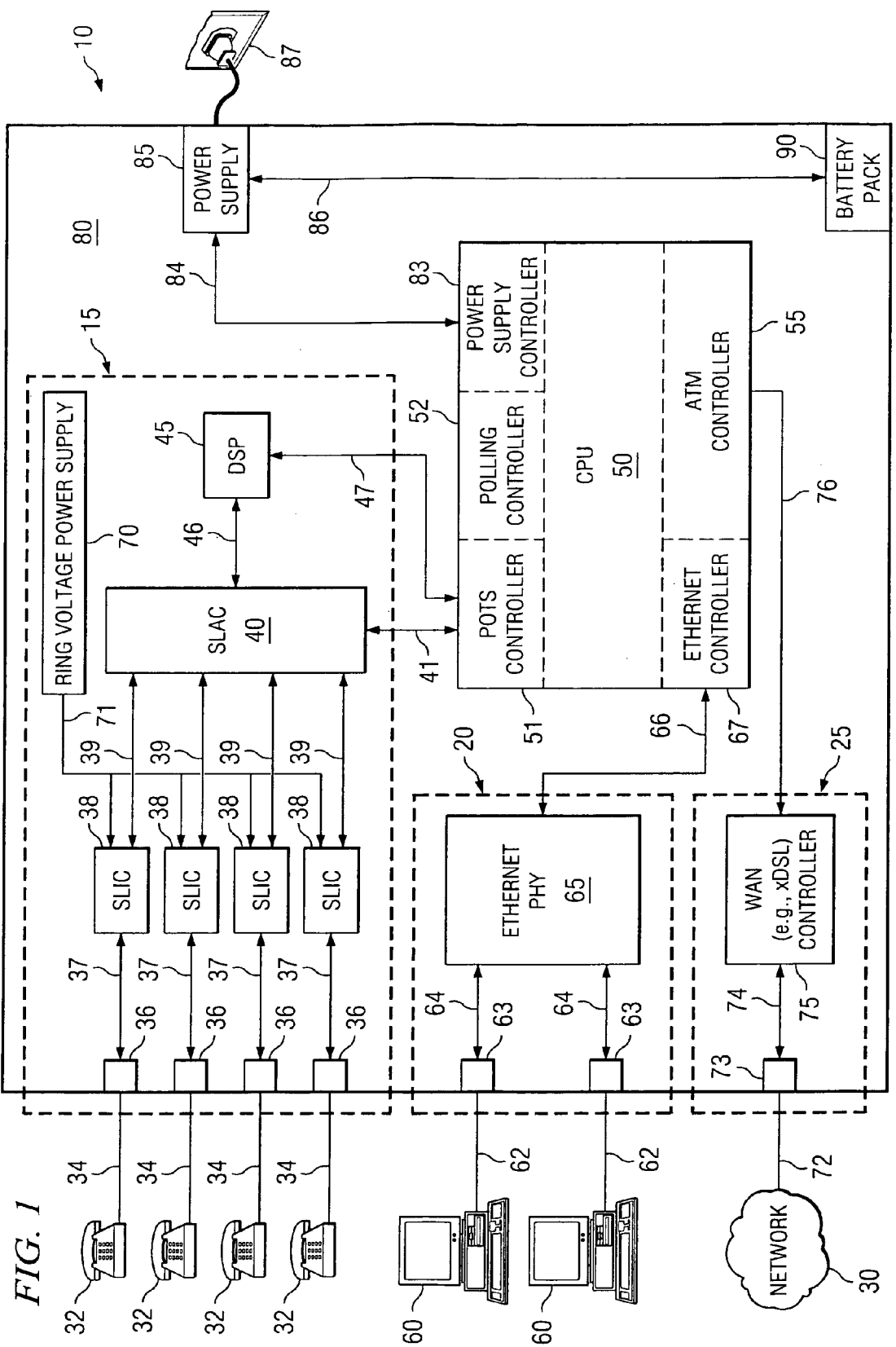
FIG. 1 is a block diagram of an integrated services hub (ISH) useful in carrying out the invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 or RJ-14 jacks. As used herein telephone generally refers to a device, a portion of which is typically handheld, for converting sound to electrical signals and vice-versa and further comprising a ringer that rings in response to a ring current, provided however that telephone should also be understood to include any device that responds to telephony signals such as a facsimile machine, modem, or computer. Telephones typically use the analog telephony format. Digital format telephones could also be used, with the understanding that the specific support circuitry in the ISH would change while providing equivalent functions (for example, detecting hook transitions).

Telephone line 34 is the physical connection connecting the telephone to a connector (i.e., jack 36) on the ISH and may be any medium operational to carry telephony signals, typically twisted pairs of copper wires. The telephone line carries electrical signals and ring current (up to the 5 REN standard load) from the ISH to one or more telephones connected to the telephone line. Telephone circuit refers to the telephony signal loop formed by the connection of one or more telephones to a POTS port on the ISH via a telephone line. The terms "ring," "ring cadence," "ring interval," "ring signature," and "ring pattern" as used herein are applicable to a telephone circuit, and thus are descriptive of the application of ring current to the telephone line as well as the signaling means (e.g., an audible tone, flashing lights, etc.) produced by a telephone in response to the ring current. In general, the ring concepts (i.e., ring, ring cadence, ringing interval, ring signature, and ring pattern) and the power requirements (i.e., ring voltage and ring current) described herein are relative to a telephone circuit independent of any particular telephone arrangement connected to the telephone circuit.

POTS interface 15 typically comprises a plurality of telephone circuits. While four telephone circuits (corresponding to four telephones 32 connected by four telephone lines 34 to four jacks 36) are shown in FIG. 1, any desirable number of telephone circuits may be employed provided that the equipment is appropriately sized to accommodate that number. As noted previously, more than one telephone may be connected to a telephone circuit.

POTS interface 15 further comprises subscriber line interface circuits (SLICs) 38, subscriber line access circuit (SLAC) 40, and digital signal processor (DSP) 45. In the preferred embodiment of FIG. 1, SLICs 38 are connected to telephone jacks 36 by connections 37 on a one-to-one basis. In other words, each telephone circuit (and its corresponding jack, telephone line, and one or more telephones) has a separate and corresponding SLIC. Alternatively, SLICs may incorporate more than one channel each, that is to say a SLIC may be connected to more than one telephone circuit. The SLICs convert relatively high power, two-line analog signals (also referred to as a tip and ring telephone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, Inc., the former Communications Products Division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Legerity, Inc., the former Communications Products Division of Advanced Micro Devices (AMD), Inc., which are each quad-devices designed to manage four SLICs.

SLAC 40 transmits and receives control data such as line status and signaling to the central processing unit (CPU) 50 by connection 41. The CPU controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various memory mapped peripherals (for example, WAN interface 25). The CPU control software includes a) a POTS control module 51 that controls the telephony functions during operation of the ISH under primary power; b) a polling control module 52 that controls the POTS telephony functions when primary power fails; c) a AC power supply control module 83 which monitors, either continuously or periodically, the AC power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with network 30. In a preferred embodiment, ATM control module 55 is a combination of hardware and software on CPU 50.

Computers 60 are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an ethernet PHY, and more specifically an MII transceiver. CPU 50 contains an ethernet control module 67, which serves as a media access control (MAC) device and is connected to LAN PHY device 65 by connection 66. The ethernet PHY and MAC devices support a 10/100 Mbit industry standard MII ethernet connection.

Network 30 is connected by connection 72 to WAN interface 25 by WAN connector 73. WAN connector 73 is preferably an RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GT3180) and a multimode xDSL downloadable DSP and framer chip (Globespan GS7070). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to AC power supply 85 and battery pack 90, thereby providing power to the ISH components, the attached analog telephones, and the battery monitoring and charge circuitry. CPU 50 contains AC power supply control module 83 connected to AC power supply 85 by connection 84. A preferred AC power supply is a universal-input (40–400 Hz, 90–270V AC RMS) switchmode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The AC power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls. Given that the ISH requires power in order to provide basic telephone service, it is important to reduce power consumption, and thereby extend battery life as long as possible. A method and apparatus for polling telephony line status in an integrated services hub to reduce power consumption is disclosed and claimed in U.S. Pat. No. 6,512,817, issued on Jan. 28, 2003, incorporated by reference herein in its entirety.

In order for ISH 10 to communicate with network 30, WAN interface 25 must establish a connection with a network element, such as a service manager, a network server, a network controller, or the like. The procedure for establishing a network connection is dependent on the type of WAN interface. For T1 and ATM (more specifically, ATM-25) the network connection protocol is a simple link-layer protocol utilizing periodic framing signals without training or automatic adaptation. For ADSL and HDSL-2, initial physical and lower protocols (commonly referred to as "handshake and training protocols") are performed. These protocol layers are located on and used by the WAN interface to determine the parameters governing the network connection such as status of the line, data transfer rates, type and speed of equipment on both ends of the line, etc. The WAN interface determines the line condition, and both ends of the link agree on the optimum configuration for those line conditions. Where the network connection is broken, for example by a power cycle or reset of the ISH, a delay is often encountered as a result of running these handshake and training protocols. During this delay in establishing the network connection, telephony services are unavailable even though the ISH is functional. To aid the customer in trouble-shooting the system, it is beneficial to inform the customer that telephony functions are unavailable because the network connection is down. Co-pending U.S. application Ser. No. 09/702,933, filed Oct. 31, 2000, incorporated by reference herein in its entirety, provides such information to the customer by checking the status of the network connection and playing an audible warning tone in the telephone receiver if the ISH is not connected to the network.

Once a network connection has been established, the ISH is available to receive incoming telephone calls. A network element (e.g., service manager) sends an incoming call signal to the ISH, which is received by WAN interface 25 and is communicated to ATM control module 55, which in turn communicates the incoming call signal to POTS control module 51. POTS control module 51 receives the incoming call signal (which contains instructions from the service manager identifying correct telephone circuit to receive the incoming call) and routes the signal to the POTS port (i.e., jack), telephone line, and telephones corresponding to the correct telephone circuit.

Upon identifying the telephone circuit to receive the incoming call, POTS control module 51 rings the telephone line by placing the corresponding SLIC into a ring state, which causes the SLIC to place the ring voltage on the telephone line. To generate the silence in a ring cadence, the SLIC is placed into an on-hook transmit state. POTS control module 51 controls the frequency and cadence of the actual ringing (i.e., the ring signature, as discussed below). Use of the ring and on-hook transmit states allow caller ID tones generated by DSP 45 to be transmitted on the telephone circuit while one or more telephones connected via the telephone line are on hook. The SLIC drives a ring voltage to the telephone line by means of an alternating ring current (AC), which in turn rings one or more telephones connected to the telephone line. Specifically, the SLIC has two terminals, a positive and a negative, connected to ring voltage power supply 70. The SLIC further comprises internal power amplifiers that drive power received via connection 71 from ring voltage power supply 70 onto the telephone line in a switched fashion with appropriate shaping in order to create a signal waveform that meets the recognized standards appropriate for telephone ringing. As used herein, the term ring generator means generically a combination of the ring voltage power supply 70, a SLIC or SLICs, and POTS control module 51 operating together to make a telephone ring.

The SLAC monitors the ringing telephone circuit to detect the off-hook condition created when a customer answers a telephone connected via the telephone line. When a customer lifts the receiver from a telephone (either during the ringing interval or the silent interval), SLAC 40 detects the off-hook condition in the corresponding telephone circuit and communicates the off-hook condition to POTS control module 51. In response, POTS control module 51 terminates the ringing function and forwards the incoming call through DSP 45, SLAC 40, and SLIC 38 onto telephone line 34 where it is received by telephone 32 and heard by the customer listening to the receiver.

POTS interface 15 can support a plurality of simultaneously active telephone circuits (each of which may have one or more corresponding telephones connected thereto). Should all the telephone circuits simultaneously receive an incoming call, for example in a business setting, the ISH (and more specifically ring voltage power supply 70 residing within the ISH) must be designed to provide sufficient ring power to ring all of the telephone circuits (and corresponding telephones) at once. One solution is to provide a ring voltage power supply of sufficient capability that it can provide sufficient ring power to each of the plurality of telephone circuits ringing simultaneously. A standard of ringer power is called the ringer equivalence number (REN), which is an amount of power roughly equal to that required to ring an 'old' electromechanical desk set. A more exact definition of 1 REN is the power required by one ringer of an AT&T standard 500 series telephone set in a single-party configuration (ringer placed across the line). According to Federal Communications Commission (FCC) regulations, each POTS port must be able to ring a 5 REN load. Thus, the ring voltage power supply would have to be sized to accommodate a maximum ring power load equal to the power required to ring a 5 REN load multiplied by the total number of simultaneously ringing circuits.

For example, in a preferred embodiment of FIG. 1, POTS interface 15 supports four telephone circuits comprising a channel bank group, which is connected to a ring generator. In order to ring all the telephones connected to a single telephone circuit, standards dictate that the ring voltage power supply 70 must provide enough power to the corresponding SLIC such that it can generate a 40VAC RMS (root mean squared) minimum ring voltage at the telephones for up to a 5 REN load, which is conveyed to the telephone(s) by telephone line 34. The power required to generate that voltage into 5 REN (including some extra for interface and wiring losses) is equal to about 1.5 W. Thus, in order to simultaneously ring all the telephone circuits (and the corresponding telephones connected thereto), the ring voltage power supply must be capable of generating this 40VAC RMS ring voltage across all four circuits with each circuit loaded with 5 REN, which results in the need for a ring voltage power supply capable of producing a maximum ring power load of about 6 watts (W). An alternative solution according to this invention is to stagger the ring cadence of the telephones such that a minimum number of telephones are actually ringing at any one time.

Figure 2:
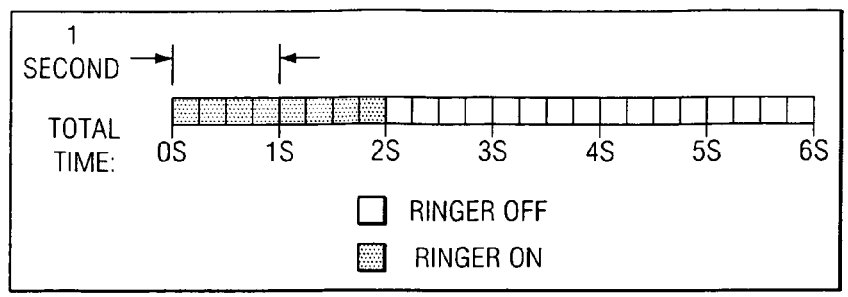
FIGS. 2, 3, and 4 are ringing interval charts.
Figure 3:
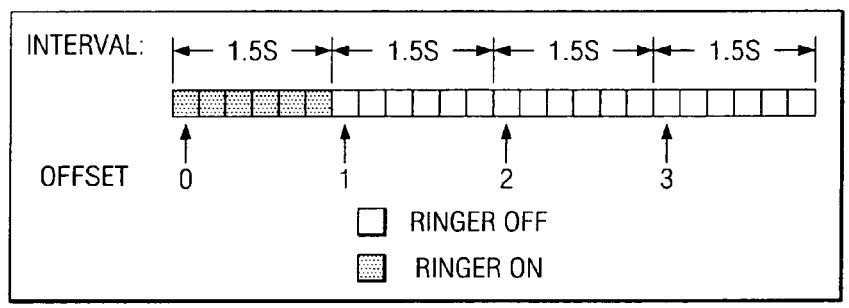

As shown in FIG. 2, industry standards call for a typical telephone ring pattern with a six second repeating cadence (herein referred to as the ring cadence), wherein the telephone rings for a period of 2 seconds (i.e., the ringing interval or "ringer on") followed by 4 seconds of silence (i.e., the non-ringing interval, silent interval, or "ringer off"). As shown in FIG. 3, by varying this cadence slightly to 1.5 seconds of ringing followed by 4.5 seconds of silence, the ring cadence can be broken down into four equal intervals of 1.5 seconds each. By staggering the ringing of each of a plurality of telephone circuits across the 6 second cadence at 1.5 second intervals (corresponding to offset starting points 0, 1, 2, and 3), the maximum ring power load on ring voltage power supply 70 can be reduced to ¼ the amount required to ring all of the phones simultaneously. Thus, where a total of power of about 6 W is required to ring all of the telephone circuits (and their corresponding telephones) simultaneously, the ring voltage power supply need only produce the minimum amount of power (i.e., about 1.5 W) to ring a single telephone circuit (and its corresponding telephones) by implementing a staggered ring in accordance with this invention.

Figure 4:
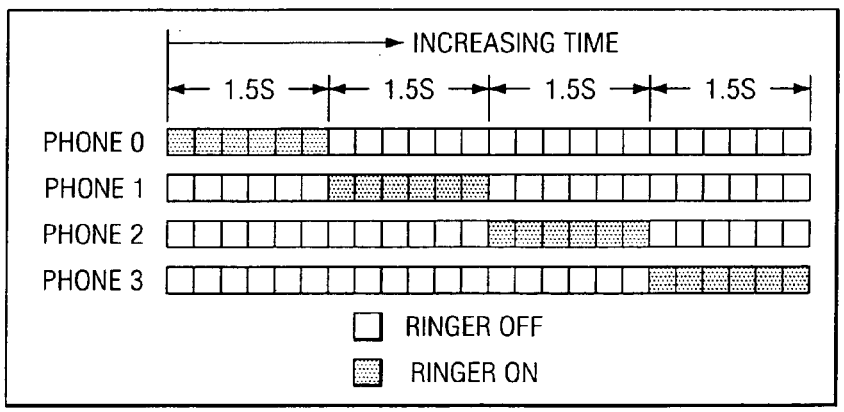

FIG. 4 shows a staggered ring cadence according to the invention for a preferred embodiment in which POTS interface 15 supports four telephone circuits each having a single telephone connected thereto and designated as telephone 0, telephone 1, telephone 2, and telephone 3, respectively. Referring to FIGS. 3 & 4, telephone 0 has an offset (i.e., staggered) starting point of 0, and rings for 1.5 seconds; telephone 1 has an offset starting point of 1 (which is 1.5 seconds after the offset starting point of 0), and rings for 1.5 seconds; telephone 2 has an offset starting point of 2 (which is 1.5 seconds after the offset starting point of 1), and rings for 1.5 seconds; and telephone 3 has an offset starting point of 3 (which is 1.5 seconds after the offset starting point of 2), and rings for 1.5 seconds. As shown in FIG. 4, each telephone begins ringing at a different point and stops ringing before the next telephone begins. By designating an offset starting point for each telephone circuit and holding that offset starting point constant across all calls, each telephone circuit always begins its ringing sequence at the same point in the ring cadence, thus assuring that there is no overlap in ringing regardless of the sequence or interval in which the telephone circuits receive incoming calls.

As discussed previously, the ring cadence comprises a ringing interval and a non-ringing interval. Referring to FIG. 4, the ring cadence is 6 seconds, and further comprises a 1.5 second ringing interval and a 4.5 second non-ringing interval. The 1.5 second ringing interval can be further broken down into ¼ second granules, which gives the ring cadence a granularity of 250 ms. Within the ringing interval, the ringer can be turned on and off using various combinations of the ¼ second granules, thereby providing the ability to produce a unique ring signature (or ring pattern) for each telephone circuit. In other words, ring signature refers to a distinctive ringing sound that may be used to identify which particular telephone circuit is ringing. This distinctive ringing capability can also be used as an indicator of other telephony functions, such as to map multiple telephone access numbers to a single telephone circuit (for instance, for differentiating fax and voice calls).

Figure 5:
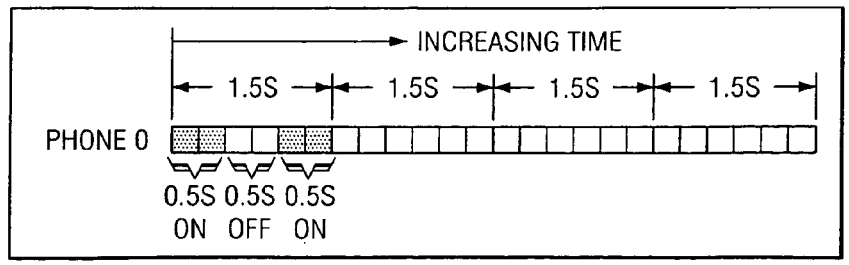

As shown in FIG. 4, the ringing interval for each telephone comprises the same ring signature of 1.5 seconds of continuous ringer on (i.e., 6 consecutive ¼ second granules of ringer on). This ring signature can be varied in order to give each telephone a distinctive ring signature. As shown in FIG. 5, an example of a distinctive ring signature is a 1.5 second interval comprising 0.5 seconds of ringer on, 0.5 seconds of ringer off, and 0.5 seconds of ringer on. It should be noted that it might become difficult to define a large number of distinctive ring signatures within a 1.5 second ringing interval having a granularity of 250 ms. In other words, a 1.5 second ringing interval having a granularity of 250 ms comprises six ¼ second granules available for use as ringer on or ringer off, and the number of distinctive rings that can be created using six ¼ second granules is limited by the ability of a customer to perceive any distinction between the varied ring signatures within the 1.5 second ringing interval. Thus, in order to create a variety of distinctive ring signatures, the ringing interval may have to be increased beyond 1.5 seconds.

There are two alternatives for addressing the need to increase the ringing interval beyond 1.5 seconds in order to produce a plurality of distinctive ring signatures. The first is to likewise increase the length of the repeating ring cadence. For example, in a preferred embodiment of the ISH having four telephone circuits, the repeating ring cadence could be increased to 8 seconds, comprising 2 seconds of ringer on followed by 6 seconds of ringer off. A number of distinctive ring signatures can be formulated within a two second ringing interval having a granularity of 250 ms (i.e., eight ¼ second granules available for ringer on and ringer off). The second alternative is to maintain the 6 second repeating ring cadence, but to formulate distinctive ring signatures that extend beyond the optimized 1.5 second ringing interval. The result is that the tail end of the ring of a telephone having a distinctive ring lasting greater than 1.5 seconds may overlap slightly with the beginning of the ring of the next telephone in the ringing sequence. However, this typically can be limited to, for example, no more than two telephone circuits ringing in overlap for no more than a portion of a ringing interval (e.g., 0.5 seconds). Thus, the ring voltage power supply will need to be sized to handle this slight overlap, thus resulting is a slight decrease from the optimized power savings.

While telephones typically ring in a repeating six second cadence, the total length and ringing intervals of the cadence can be varied to optimize for the number of telephone circuits being served by the ISH. For example, with five telephone circuits, the ring cadence could be extended to 7.5 seconds, wherein each telephone circuit rings for 1.5 seconds and remains silent for 6 seconds. With three telephone circuits, the typical 6 second ring cadence could be used, wherein each telephone circuit rings for 2 seconds and remains silent for four seconds. However, it should be noted that variations on the ring cadence might be limited by the impact on customer perception, that is customers may not like a slow or fast ringing telephone. For example, if eight telephone circuits are being served by the ISH, the ring cadence could be extended to eight seconds and the ringing interval shortened to 1 second, wherein each telephone circuit rings for 1 second and remains silent for 7 seconds. However, this may be unacceptable from a customer satisfaction standpoint.

A preferred embodiment is to place four of the telephone circuits on a first channel bank group and the remaining four telephone circuits on a second channel bank group. The first channel bank group has a corresponding first ring generator which provides ring voltage and current to the telephones connected to the telephone circuits in the first channel bank group, and the second channel bank group has a corresponding second ring generator which provides ring voltage and current to the telephones connected to the telephone circuits in the second channel bank group. The ring cadence for each channel bank group is the six second repeating cadence (1.5 seconds ringer on followed by 4.5 seconds ringer off) shown in FIGS. 3 and 4, and discussed above. The result is that a single telephone circuit from the first channel bank group of telephone circuits can ring simultaneously with a single telephone circuit from the second channel bank group of telephone circuits, but two telephone circuits within the same channel bank group cannot ring simultaneously. The total ring power required to properly support ringing across all eight telephone circuits in the preferred embodiment is about 3 W. By comparison, the power required to ring the four telephone circuits within each channel group simultaneously is about 6 W, or the power required to ring all eight telephone circuits simultaneously is about 12 W. Thus, the preferred embodiment according to the invention results in a 75 percent reduction in the total instantaneous ring power required to supply ringing the eight telephone circuits.

What is claimed is:

1. A method for reducing the power required by an integrated services hub on a customer premises converting digital network signals to analog telephony signals for a plurality of telephone circuits on the customer premises and providing ring current during the same ring cadence to all of the circuits then receiving calls, the integrated services hub comprising a ring voltage power supply and a backup battery, comprising offsetting the ringing interval of each of the plurality of telephone circuits by a preselected amount such that all the telephone circuits do not ring simultaneously during the same ring cadence;
   whereby the size and power dissipation of the ring voltage power supply may be reduced and the backup battery life may be extended.

2. The method of claim 1 wherein the step of offsetting the ringing interval of each of the plurality of telephone circuits further comprises:
   providing each telephone circuit with a ring cadence comprising a ringing interval and a non-ringing interval; and
   defining a starting point for the ringing interval within each telephone circuit's ring cadence such that the starting point for the ringing interval for at least one telephone circuit falls substantially outside the ringing intervals of the remaining telephone circuits.

3. The method of claim 2 wherein the step of defining a starting point for the ringing interval within each telephone circuit's ring cadence is defined such that the starting point for the ringing interval for each telephone circuit does not fall substantially within the ringing interval of any other telephone circuit.

4. The method of claim 3 wherein the ring cadence is a six second repeating cadence having a 1.5 second ringing interval and a 4.5 second non-ringing interval.

5. The method of claim 4 wherein the ring cadence has a granularity of 250 ms.

6. The method of claim 4 wherein the ring signature is varied within the ringing interval.

7. The method of claim 1 further comprising dividing the plurality of telephone circuits into at least two channel bank groups and offsetting the ringing of the telephone circuits within each of the channel bank groups such that no more than about one telephone circuit from each channel bank group is ringing simultaneously.

8. An apparatus for reducing the power required by an integrated services hub on a customer premises converting digital network signals to analog telephony signals for a plurality of telephone circuits on the customer premises, the integrated services hub comprising a ring voltage power supply and a backup battery, comprising:
   a plurality of subscriber line access circuits (SLICs) connected to and receiving power from the ring voltage power supply, each SLIC connected to telephone circuit further comprising a telephone line for driving a ring voltage to a telephone connected to the telephone line; and
   a microprocessor connected to and controlling the SLICs, the microprocessor providing each SLIC with a ring cadence for each telephone circuit comprising a ringing interval and a non-ringing interval; and defining a starting point for the ringing interval within each telephone circuit's ring cadence such that the starting point for the ringing interval for at least one telephone circuit falls substantially outside the ringing intervals of the remaining telephone circuits whereby all the telephone circuits do not ring simultaneously;
   whereby the size and power dissipation of the ring voltage Power supply may be reduced and the backup battery life may be extended.

9. The apparatus of claim 8 wherein each SLIC further comprises a positive terminal and a negative terminal connected to the ring voltage power supply and internal power amplifiers that drive power received from the ring voltage power supply via the terminals onto the telephone line.

10. The apparatus of claim 8 wherein the plurality of telephone circuits is divided into at least two channel bank groups, the microprocessor connected to and controlling each of the channel bank groups such that no more than about one telephone circuit from each channel bank group is ringing simultaneously.

* * * * *